2,909,449
VINYLIDENE CHLORIDE COPOLYMER COATING COMPOSITIONS

Thomas Franklin Banigan, Kenmore, N.Y., assignor to E. I. du Pont de Nemours and Company, Wilmington, Del., a corporation of Delaware No Drawing. Application February 3, 1956
Serial No. 563,187

20 Claims. (Cl. 117—145)

This invention relates to coating processes and, more particularly, to improvements in coating non-fibrous base materials with aqueous dispersions comprising vinylidene chloride polymers or other synthetic polymers, whereby to form on the base materials continuous protective coatings comprising the polymers, which coated materials have excellent anti-blocking and improved slip properties.

Gilbert Pitzl, in U.S. Patents Nos. 2,541,167 and 2,570,478, discloses the coating of regenerated cellulose film with an aqueous dispersion of fine particles of amorphous vinylidene chloride polymer. The resulting coatings, after drying, are tough, flexible, strong, odorless, transparent, heat-sealable, and inherently moisture-resistant and, hence, constitute potentially valuable protective coatings for the base film. However, coatings of normally crystalline polymers such as vinylidene chloride polymers, i.e., coatings applied from an aqueous dispersion of amorphous polymer particles having a particle size ranging from 0.05 to 0.5 of a micron, whether on regenerated cellulose film or on any other non-fibrous, smooth base sheet of organic material, e.g., polyethylene terephthalate, cellulose acetate, etc., have two serious disadvantages, viz.: (1) The coated sheets or film tend to have strong blocking or matting characteristics, i.e., when superimposed sheets or film are pressed together (as in stacking for storage), the contacting surfaces strongly adhere to one another; and (2) sheets or film coated with such polymers have poor slip. "Slip" may be defined as a measure of the ease with which two contacting surfaces of a film slide past each other when held together under constant pressure while being subjected to a shearing action. These disadvantages are of particular concern when the coated film is to be used in automatic packaging and wrapping machines.

It is common practice to overcome matting and slip deficiencies by dusting film surfaces with particles of a dry material, such as talcum powder, or by treating with a liquid which will deposit solid particles on the film, cf.:

U.S. 2,008,815 (Brandenberger et al.)
U.S. 2,095,129 (Drew)
U.S. 2,167,105 (Drew)
U.S. 2,206,046 (Pollard)
U.S. 2,251,752 (Mitchell)

In either case, the treated film is covered with minute particles of solid materials which, in effect, roughen the surface and prevent intimate contact between film surfaces or between the film and some other surface, such as occurs in bag-making, packaging and wrapping machines. It is also possible to reduce matting and improve slip, in some cases, by the incorporation of particles of solid materials in the coating compositions. While these prior art expedients have proven generally satisfactory in the treatment of uncoated film and film coated with wax-containing moistureproofing compositions heretofore employed, difficulties have been encountered in all instances where such known treatments have been used on vinylidene chloride polymer and like polymer coatings. Dusting vinylidene chloride polymer-coated film with powdered materials, for example, is likely to cause objectionable surface haze and the loosely-attached particles may be rubbed off, leaving the film more or less in its original condition. When dusted film is printed on continuous printing machines, the dust particles also tend to adhere to the transfer and printing rolls from which they may become dislodged in flake form, causing unprinted spots in the film. The incorporation of the particulate material in the coating composition, in sufficient amount to impart optimum slip and reduced matting, is likely to result in hazy coatings. Moreover, when such coatings are applied by press-roll techniques, the moisture permeability of the coated film is generally seriously impaired. Liquid sizing treatments frequently leave objectionable hazy streaks and patterns on the film.

An object of this invention, therefore, is to provide polymer dispersion-coated films, of the character above described, having satisfactory slip characteristics and substantially no tendency to blocking. Another object is to inhibit blocking and enhance the slip characteristics of the hereinabove described polymer dispersion-coated film without adversely affecting other and desirable properties of the film such as clarity, heat-seal bond strength, moisture permeability, etc., irrespective of the coating method employed. These and other objects will more clearly appear hereinafter.

The foregoing objects are realized by the present invention which, briefly stated, comprises adding to the aqueous dispersions of substantially amorphous vinylidene chloride copolymer particles ranging in size from 0.05 to 0.5 of a micron to be coated on the non-fibrous organic base film, particles of a polymer chemically identical to, or similar, having substantially the same index of refraction, as the polymer component of the dispersion, said particles ranging in size from 2 to 65 microns. The dispersion is coated on the base film in conventional fashion and dried (water removed). Due to the added polymer particles of larger size, the resulting coating has a slightly roughened surface having excellent slip and substantially no blocking tendencies.

As representative examples from the class of vinylidene chloride copolymers useful for coating non-fibrous organic base sheets, there may be mentioned: copolymers of vinylidene chloride/acrylonitrile, vinylidene chloride/methacrylonitrile, vinylidene chloride/methyl acrylate, vinylidene chloride/ethyl acrylate, vinylidene chloride/butyl acrylate, vinylidene chloride/isobutyl acrylate, vinylidene chloride/methyl methacrylate, vinylidene chloride/ethyl methacrylate, vinylidene chloride/butyl methacrylate, vinylidene chloride/isobutyl methacrylate, vinylidene chloride/methyl vinyl ketone, vinylidene chloride/vinyl chloride, vinylidene chloride/vinyl acetate, vinylidene chloride/styrene, vinylidene chloride/ dichlorovinylidene fluoride, vinylidene chloride/chloroprene, vinylidene chloride/butadiene, and vinylidene chloride/methoxy-methoxyethyl methacrylate. Itaconic acid may be copolymerized with each of the above to give 3 component systems. Also useful are copolymers of vinylidene chloride/dimethyl itaconate, vinylidene chloride/diethyl itaconate, vinylidene chloride/dibutyl itaconate, vinylidene chloride/vinyl pyridine, and vinylidene chloride/isoprene. Generally, the copolymer should contain not less than 75% of vinylidene chloride.

Any non-fibrous organic sheet or film susceptible to being coated with an aqueous dispersion of a vinylidene chloride copolymer may be used for purposes of this invention. Because of its commercial importance, regenerated cellulose film constitutes a preferred base film. Other suitable base materials are films of polyethylene; polyethylene terephthalate; polyvinyl alcohol; lowly esterified or etherified cellulose; casein; various polyamides such as polyhexamethylene adipamide, polyhexamethylene sebacamide, polycaproamide, and other types described in U.S. Patents Nos. 2,071,250 and 2,071,253; various cellulose esters such as cellulose acetate, cellulose nitrate, and cellulose acetate-butyrate; polyvinyl acetals; and vinyl compounds such as polyvinyl chloride/polyvinyl acetate copolymer, etc.

Preferably, the polymer particles added to the copolymer dispersion coating composition and the copolymer of the dispersion should be chemically identical. However, chemical identity of the two polymer components, though preferred, is not an essential feature of the invention. It is only requisite that the polymer particles and dispersion copolymer be chemically similar with respect, at least, to their major chemical components so that the two will have substantially the same refractive indices and will satisfactorily adhere together. "Chemically similar," as used herein, means that the major monomer constituent of the copolymer in the dispersion and the major monomer constituent of the added polymer particles should be the same in kind and substantially the same in proportion. For example, in using the preferred dispersion copolymer containing at least 75% vinylidene chloride, the polymer of the added particles should also contain at least about 75% of vinylidene chloride. In all cases tested, where particles did not conform to this specification, they made the coated film objectionably hazy and where the coating was applied by press rolls, such particles seriously increased the moisture permeability of the film. The development of excessive haze was due to differences between the indices of refraction of the coating and the particles. If the particle itself is moisture-permeable, moisture may enter through the very thin coating over the particle and penetrate the base film. When the particle is distinctly different in chemical composition from the coating, cohesion between the coating and the particle is so poor that the coating, as it dries, tends to shrink away from the particle leaving a passageway around the particle through which water or water vapor may penetrate.

The coating, in accordance with this invention, is a continuous coalesced layer of vinylidene chloride copolymer resulting from the coalescence of relatively fine particles of amorphous polymer, i.e., particles ranging in size from 0.05 to 0.5 of a micron, said layer having relatively coarse added particles dispersed throughout as well as at the surface thereof. Operable particle size range for the polymer particles to be added is from about 2 to 65 microns in diameter, with the preferred range being from 8 to 10 microns average diameter. The shape and manner of preparation of the particles are not critical. They may range from spherical to irregular. They may be produced by grinding the polymer, direct polymerization to the desired size, or by controlled precipitation from fine polymerization dispersion.

The polymer particles should be added to the dispersion in amounts of from 0.5% to 5.0% (based on the weight of polymer in the dispersion). The preferred range is from 1.0% to 1.5%.

The following examples specifically illustrate the principles and practice of this invention. Parts and percentages are by weight unless otherwise indicated.

EXAMPLE 1

An aqueous dispersion of a copolymer of vinylidene chloride, methyl acrylate and itaconic acid was prepared according to the following formula:

| | Parts |
|---|---|
| Vinylidene chloride | 376 |
| Methyl acrylate | 24 |
| Itaconic acid | 8 |
| Water | 400 |
| Ammonium persulfate | 0.8 |
| Meta sodium bisulfite | 0.4 |
| Duponol ME [1] | 8 |

[1] Sodium salts of sulfated straight-chain alcohols ranging from $C_{10}$ to $C_{18}$.

The dispersion was prepared by placing all the solids, including itaconic acid, in a round-bottom vessel, then water, and, finally, the premixed monomers. The mixture was refluxed with agitation for two hours at 33°–34° C. Four parts of Duponol ME in a small amount of water were added after reflux ceased. The copolymer particles in the dispersion so produced ranged in size from 0.05 to 0.5 of a micron. To a portion of the dispersion so prepared were added 1.5% (based on the weight of polymer in the dispersion) of copolymer particles chemically identical with the copolymer in the dispersion (made from 376 parts of vinylidene chloride, 24 parts of methyl acrylate, and 8 parts of itaconic acid) with the particle size ranging from 2 to 20 microns and averaging 4 to 6 microns along the major axis. These particles were made by precipitating a portion of the original dispersion, washing, wet-grinding and water-classifying to remove oversize particles.

Regenerated cellulose film approximately 0.0013" thick was coated with the dispersion containing the added polymer particles, and dried to give a coated film containing 6.3 grams of coating per square meter of base film. The dried coated film was then evaluated for slip, matting, initial permeability value (I.P.V.) and heat-seal bond strength, as explained below, with the results shown in Table I. A control, for purposes of comparison, was prepared by similarly coating regenerated cellulose base film 0.0013" thick with the portion of dispersion not containing the polymer particles, and drying. Slip and matting, as shown in Table I, were both poor.

*Slip*

Slip was determined, in each instance, by folding the sheet and applying maximum, uniform squeezing pressure on the folded sheet between the thumb and forefinger and immediately, without releasing the pressure, following this with a shearing movement of the thumb and forefinger.

The three gradings for slip are defined as follows:

(1) The surface slides smoothly over itself. Slip is excellent.

(2) The surfaces slide jerkily over themselves, i.e. slip interruptedly, tend to jump or catch (usually at the beginning of the shearing movement). Slip is fair.

(3) The surface does not slide over itself and the thumb and forefinger tend to slip first. Slip is poor.

*Matting*

(A) *Preparation of samples.*—A stack consisting of 30 to 32 3½" x 4" sheets of film, piled back to front throughout the stack, is placed on a 3½" x 4" sheet of chipboard and covered with a similar square of chipboard. The assembly is placed on a smooth sheet of metal at least 1/16" thick and approximately 6" square. A lead weight with a smooth face (3½" x 4") weighing a total of 4.6 lbs. (⅓ lb. per sq. in.) is accurately placed on top of the stack and the entire assembly is placed in an oven maintained at 45° C. with care exercised to prevent disturbing the uniform alignment of the sheets. For convenience in handling, the weight should have an inverted U handle which can be made from ¼" metal rod. Several stacks of sheets, prepared as described above, can be piled together under one weight. The weighted sheets are held in the 45° C. oven for 24 hours, though no appreciable differences in matting result from retaining them in the oven for considerably longer periods such as three or more days. The stacks are then carefully removed from the oven and allowed to cool to room temperature (30 minutes or more) after which they are graded.

(B) *Grading.*—After removal of the chipboard, the stack of film sheets is grasped by thumb and forefinger in the center of the stack. A shearing force is then applied with care taken to avoid bending the stack or disturbing its edges. Results are graded as follows:

Grade 1—The sheets slide apart individually with no tendency whatever to cling together.
Grade 1+—The sheets slide apart individually but with perceptible cling.
Grade 2—The stack separates into two or more groups of sheets which remain moderately firmly matted together.
Grade 2+—The stack separates on application of the maximum force into two or more groups of sheets which are firmly matted together.
Grade 3—The stack cannot be separated by straight force.
Note: Easy separation of the top and bottom sheets in 2, 2½ and 3 gradings should be disregarded.

*I.P.V.*

Initial permeability value is a measure of the moisture-proofness of the coated film. The definition of and test for determining moistureproofness (I.P.V.) are set forth in U.S. Patent No. 2,147,180 (Ubben).

*Heat-seal bond strength*

Heat-seal bond strength is a measure of the strength of the bond between two films when they are sealed together by heat and pressure. For the purpose of comparison and definition, the following test is used to measure the strength of the heat-seal bond: A piece of the coated film 4" x 10" with the grain running in the long direction, is cut into two pieces 4" x 5", handling all pieces by the corners so as not to contact the areas to be sealed. The two pieces 4" x 5" are superimposed one on the other so that opposite surfaces are in contact. The two pieces of superimposed film are then sealed together at each end, at right angles to the grain, with a sealing bar ¾" wide, heated to 150° C. at 20 p.s.i. pressure and 2 seconds contact time. The sealed sheets are then cut in half at right angles to the grain, and each half is cut into 1½" wide strips, parallel to the grain, from the center of the sheets, resulting in four sets to be tested. Each set of the 1½" wide sealed strips is opened at the free ends, placed in a Suter tensile strength tester, and pulled apart. The force in grams required to pull the strips apart is taken as a measure of the heat-seal bond strength. Whereas the initial heat-seal value is the force in grams required to just rupture the seal the peel heat-seal value is the force required to separate the seal after it has been ruptured. It usually takes more force to rupture the heat-seal initially than it does to separate the seal after it has once been ruptured.

EXAMPLE 2

An aqueous dispersion of a copolymer of vinylidene chloride, methyl acrylate and itaconic acid was prepared according to the formula in Example 1. To a portion of this dispersion was added 1.0% (based on the weight of the copolymer in the dispersion) of copolymer particles chemically identical with the dispersion copolymer. The particle size of the added copolymer ranged from 2 to 20 microns and averaged 4 to 6 microns along the major axis. Regenerated cellulose film approximately 0.0013" thick was then coated with the dispersion containing 1.0% added particles, dried, and evaluated. Coated film with good slip and fair matting resistance resulted as shown in Table I. Regenerated cellulose film similarly coated but omitting the addition of polymer particles to the coating dispersion exhibited poor slip and a marked tendency to matting as shown in Table I.

EXAMPLE 3

Regenerated cellulose film was coated as in Examples 1 and 2 and evaluated as in the previous examples. The results are shown in Table I.

EXAMPLE 4

An aqueous dispersion of a copolymer of vinylidene chloride, methyl acrylate and itaconic acid was prepared according to the formula of Example 1 and to this dispersion was added 0.75% (based on the weight of copolymer in the dispersion) of copolymer particles chemically identical with the dispersion copolymer. The particle size ranged from 2–32 microns and averaged 6–10 microns along the major axis. Regenerated cellulose film approximately 0.0013" thick was then coated with the dispersion, dried, and the coated film evaluated as in the previous examples. The results are set forth in Table I.

EXAMPLE 5

The procedure of Example 4 was followed except that 1.0% of polymer particles were added to the dispersion prior to coating. Results are shown in Table I.

EXAMPLE 6

The procedure of Example 4 was followed except that 1.5% of polymer particles were added to the dispersion with the results shown in Table I.

EXAMPLE 7

The procedure of Example 4 was followed except that 2.5% of polymer particles were added to the dispersion with the results shown in the table.

EXAMPLE 8

The procedure of Example 6 was followed except that added polymer particles running from 2 to 20 microns and having an average particle size of 5–6 microns were employed. Results were as shown in Table I.

EXAMPLE 9

The procedure of Example 8 was followed except that 2.0% of polymer particles were added to the coating dispersion with the results shown in Table I.

EXAMPLE 10

The procedure of Example 8 was followed except that 2.5% of polymer particles were used in the coating dispersion. The coated film had the properties shown in Table I. A control prepared in the same way but with the omission of added polymer particles exhibited matting and poor slip, as shown in the table.

EXAMPLE 11

1.5% of copolymer particles ranging in diameter from 2 to 90 microns and averaging about 40 to 60 microns were added to an aqueous dispersion of the same formula as Example 1. The coated film had good slip, blocking, and other properties; but the coated surface was rough and grainy due to the coarse particles. It should be noted that the moisture permeability was not damaged by the coarse particles as compared with a control prepared in the same fashion but omitting the polymer particle addition. See Table I.

EXAMPLE 12

This example shows what happens when the particle sizes are somewhat smaller than those in Example 11. 1.5% of added particles ranging in diameter from 2 to 65 microns and averaging 10 to 15 microns in diameter gave coated film with good slip and anti-blocking properties.

EXAMPLE 13

This example shows that particles of a chemically similar polymer are also operable. To a polymer dispersion containing 94/6/2 vinylidene chloride/methyl acrylate/itaconic acid copolymer having a particle size ranging from 0.05 to 0.5 of a micron were added 1.5% of ground 92/8 vinylidene chloride/acrylonitrile copolymer particles with an average size of 20 to 30 microns and some particles ranging up to 70 microns along their major axis. The coated film had grade 2 slip and was slightly hazy. Matting was grade 2. See Table I.

particles ranging in size from 2 to 65 microns are composed of a copolymer of at least 75% vinylidene chloride and up to 25% of acrylonitrile.

TABLE I

| Example | Coating Weight, gm..m.² | Copolymer Particle Size, (microns) | Percent Particles | Slip | Matting 1 Day at 45° C. | I.P.V. 1st 24 hrs. | Heat-Seal Bond Strength, Grams— 150° C. (Initial Peel (p)) | | | Appearance |
|---|---|---|---|---|---|---|---|---|---|---|
| | | | | | | | 35% R.H. | 81% R.H. | 93% R.H. | |
| 1 | 6.3 | 2–20, Avg. 4–6 | | 1.5 | 1/1 | 1+ | 63 | 403/403 | 229/239 | 150/116 | Very light haze. |
| Control | 6.4 | None | | | 3/3 | 3 | 62 | 445/481 | 265/259 | 204/108 | Clear. |
| 2 | 7.3 | 2–20, Avg. 4–6 | | 1.0 | 1/1+ | 2– | 66 | 354/351 | 309/294 | 186/106 | Do. |
| Control | 6.3 | None | | | 2/3 | 3 | 85 | 333/509 | 198/236 | 168/113 | Do. |
| 3 | 7.2 | 2–20, Avg. 4–6 | | 1.5 | 1/1+ | 1+ | 65 | 346/449 | 286/258 | 158/77 | Do. |
| Control | 6.7 | None | | | 3/3 | 3 | 77 | 290/368 | 226/192 | 145/71 | Do. |
| 4 | 5.4 | 2–32, Avg. 6–10 | .75 | 1/2 | 2 | 143 | 110(p) | 182(p) | 153(p) | Do. |
| 5 | 5.2 | 2–32, Avg. 6–10 | 1.0 | 1/2 | 2– | 130 | 120(p) | 148(p) | 145(p) | Very light haze. |
| 6 | 5.0 | 2–32, Avg. 6–10 | 1.5 | 1/1 | 2– | 112 | 137(p) | 195(p) | 173(p) | Very light haze, grainy. |
| 7 | 4.5 | 2–32, Avg. 6–10 | 2.5 | 1/1 | 1+ | 165 | 237(p) | 228(p) | 121(p) | Light hazy, grainy. |
| 8 | 6.6 | 2–20, Avg. 5–6 | 1.5 | 1/1 | 1+ | 130 | 485(p) | 245(p) | 163(p) | Very light haze. |
| 9 | 6.75 | 2–20, Avg. 5–6 | 2.0 | 1/1 | 1+ | 102 | 504(p) | 254(p) | 138(p) | Do. |
| 10 | 6.96 | 2–20, Avg. 5–6 | 2.5 | 1/1 | 1+ | 116 | 524(p) | 275(p) | 140(p) | Do. |
| Control | 8.3 | None | | | 3/3 | 3 | 109 | 329(p) | 190(p) | 125(p) | Clear. |
| 11 | 5.40 | 2–90, Avg. 40–60 | 1.5 | 1+/1+ | 2– | 57 | 471(p) | 319(p) | 164(p) | Film grainy. |
| Control | 6.20 | None | | | None | 3 | 75 | 371(p) | 193(p) | 111(p) | Smooth—clear. |
| 12 | 6.5 | 2–65, Avg. 10–15 (only 5–10% larger than 40) | 1.5 | 1/1 | 1+ | 96 | 389/332 | 238/163 | 125/35 | Very light haze. |
| 13 [1] | 9.94 | Avg. 20–30 (up to 70) | 1.5 | 2 | 2 | 47 | 550/423 | 275/195 | 229/68 | Slight haze. |

[1] 94/6/2—Vinylidene chloride/methyl acrylate/itaconic acid copolymer dispersion. 92/8—Vinylidene chloride/acrylonitrile copolymer particles.
Note.—Slip—First number=slip of top surface on itself; second number=slip of bottom surface on itself.
Note.—Examples 4–10, inclusive, were heat-sealed at 145° C.

As many widely different embodiments may be made without departing from the spirit and scope of this invention, it is to be understood that this invention is in no way restricted except as set forth in the appended claims.

This application is a continuation-in-part of my co-pending application Serial No. 347,855, filed April 9, 1953, now abandoned.

I claim:

1. A process for improving the heat-sealability, moisture resistance, slip property, and blocking property of a smooth, non-fibrous base sheet of organic material which comprises coating said sheet with an aqueous dispersion containing 95–99.5% of one group of particles ranging in size from 0.05–0.5 micron and 0.5–5.0% of a second group of particles ranging in size from 2–65 microns, said groups of particles each composed of a copolymer of at least 75% vinylidene chloride and up to 25% of at least one other ethylenically unsaturated compound copolymerizable therewith; and drying said coated sheet.

2. A process for improving the heat-sealability, moisture resistance, slip property, and blocking property of a smooth, non-fibrous regenerated cellulose sheet which comprises coating said sheet with an aqueous dispersion containing 95–99.5% of one group of particles ranging in size from 0.05–0.5 micron and 0.5–5.0% of a second group of particles ranging in size from 2–65 microns, said groups of particles each composed of a copolymer of at least 75% vinylidene chloride and up to 25% of at least one other ethylenically unsaturated compound copolymerizable therewith; and drying said coated sheet.

3. A process as in claim 2 wherein both groups of particles are composed of a copolymer of at least 75% vinylidene chloride and up to 25% of an alkyl acrylate.

4. A process as in claim 2 wherein both groups of particles are composed of a copolymer of at least 75% vinylidene chloride and up to 25% of methyl acrylate.

5. A process as in claim 2 wherein both groups of particles are composed of a copolymer of vinylidene chloride/methyl acrylate/itaconic acid in which the proportions are 94/6/2, respectively.

6. A process as in claim 2 wherein the group of particles ranging in size from 0.05 to 0.5 micron are composed of a copolymer of at least 75% vinylidene chloride and up to 25% of methyl acrylate, and the group of particles ranging in size from 2 to 65 microns are composed of a copolymer of at least 75% vinylidene chloride and up to 25% of acrylonitrile.

7. A process as in claim 2 wherein the group of particles ranging in size from 0.05 to 0.5 micron are composed of a copolymer of vinylidene chloride/methyl acrylate/itaconic acid in which the proportions are 94/6/2, respectively, and the group of particles ranging in size from 2 to 65 microns are composed of a copolymer of vinylidene chloride/acrylonitrile in which the proportions are 92/8, respectively.

8. A coating composition comprising an aqueous dispersion containing 95–99.5% of one group of particles ranging in size from 0.05–0.5 micron and 0.5–5.0% of a second group of particles ranging in size from 2–65 microns, said groups of particles each composed of a copolymer of at least 75% vinylidene chloride and up to 25% of at least one other ethylenically unsaturated compound copolymerizable therewith.

9. A coating composition as in claim 8 wherein both groups of particles are composed of a copolymer of at least 75% vinylidene chloride and up to 25% of an alkyl acrylate.

10. A coating composition as in claim 8 wherein both groups of particles are composed of a copolymer of at least 75% vinylidene chloride and up to 25% of methyl acrylate.

11. A coating composition as in claim 8 wherein both groups of particles are composed of a copolymer of vinylidene chloride/methyl acrylate/itaconic acid in which the proportions are 94/6/2, respectively.

12. A coating composition as in claim 8 wherein the group of particles ranging in size from 0.05 to 0.5 micron are composed of a copolymer of at least 75% vinylidene chloride and up to 25% of methyl acrylate, and the group of particles ranging in size from 2 to 65 microns are composed of a copolymer of at least 75% vinylidene chloride and up to 25% of acrylonitrile.

13. A coating composition as in claim 8 wherein the group of particles ranging in size from 0.05 to 0.5 micron are composed of a copolymer of vinylidene chloride/methyl acrylate/itaconic acid in which the proportions are 94/6/2, respectively, and the group of particles ranging in size from 2 to 65 microns are composed of a copolymer of vinylidene chloride/acrylonitrile in which the proportions are 92/8, respectively.

14. A coated sheet comprising a base sheet of a smooth, non-fibrous organic material having on the surface thereof particles of a copolymer of at least 75% vinylidene chloride and up to 25% of at least one other ethylenically unsaturated compound copolymerizable therewith, 95–99.5% of said particles ranging in size from .05 to 0.5 micron and .05 to 5.0% of said particles ranging in size from 2 to 65 microns.

15. A coated sheet comprising a base sheet of regenerated cellulose having on the surface thereof particles of a copolymer of at least 75% vinylidene chloride and up to 25% of at least one other ethylenically unsaturated compound copolymerizable therewith, 95–99.5% of said particles ranging in size from .05 to 0.5 micron and .05 to 5.0% of said particles ranging in size from 2 to 65 microns.

16. A coated sheet as in claim 15 wherein all particles are composed of a copolymer of at least 75% vinylidene chloride and up to 25% of an alkyl acrylate.

17. A coated sheet as in claim 15 wherein all particles are composed of a copolymer of at least 75% vinylidene chloride and up to 25% of methyl acrylate.

18. A coated sheet as in claim 15 wherein all particles are composed of a copolymer of vinylidene chloride/methyl acrylate/itaconic acid in which the proportions are 94/6/2, respectively.

19. A coated sheet as in claim 15 wherein the particles ranging in size from 0.05 to 0.5 micron are composed of a copolymer of at least 75% vinylidene chloride and up to 25% of methyl acrylate, and the particles ranging in size from 2 to 65 microns are composed of a copolymer of at least 75% vinylidene chloride and up to 25% of acrylonitrile.

20. A coated sheet as in claim 15 wherein the particles ranging in size from 0.05 to 0.5 micron are composed of a copolymer of vinylidene chloride/methyl acrylate/itaconic acid in which the proportions are 94/6/2, respectively, and the particles ranging in size from 2 to 65 microns are composed of a copolymer of vinylidene chloride/acrylonitrile in which the proportions are 92/8, respectively.

References Cited in the file of this patent

UNITED STATES PATENTS

| | | |
|---|---|---|
| 2,570,478 | Pitzl | Oct. 19, 1951 |
| 2,636,870 | Connors | Apr. 28, 1953 |
| 2,748,027 | Meier | May 29, 1956 |

FOREIGN PATENTS

| | | |
|---|---|---|
| 665,479 | Great Britain | Jan. 23, 1952 |